March 11, 1969  A. GEISSEL  3,432,109
MACHINE FOR DISPERSING AND COMMINUTING FLOWABLE MATERIALS
Filed April 22, 1966  Sheet 3 of 5

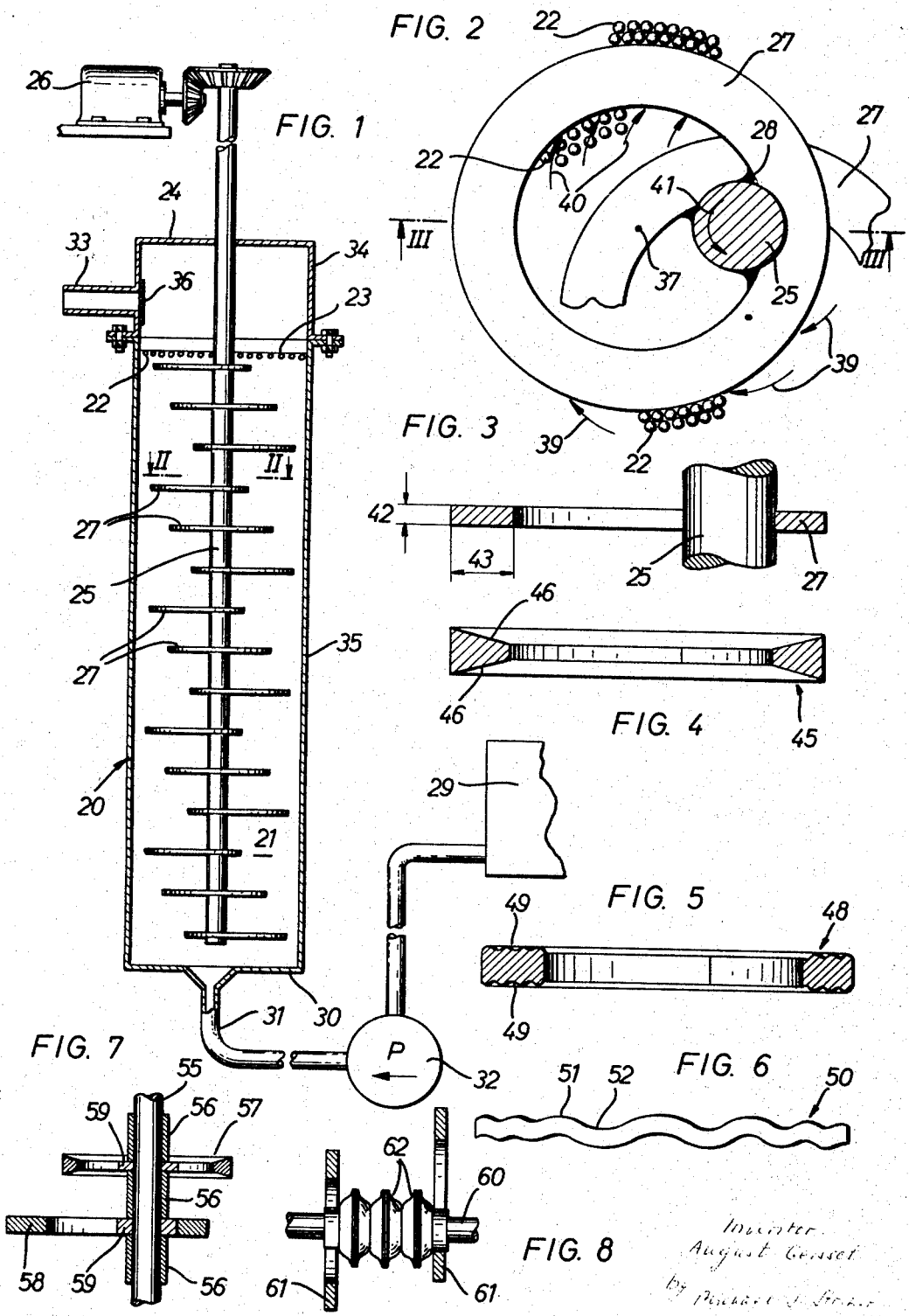

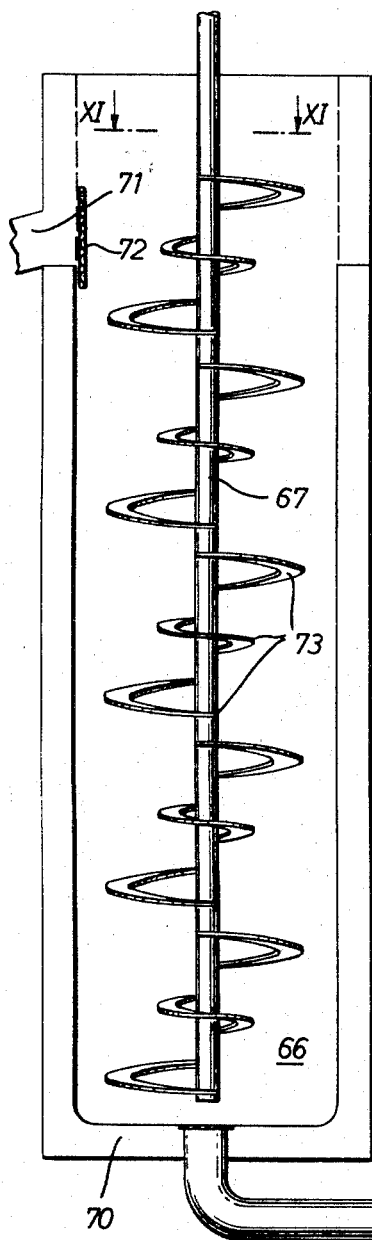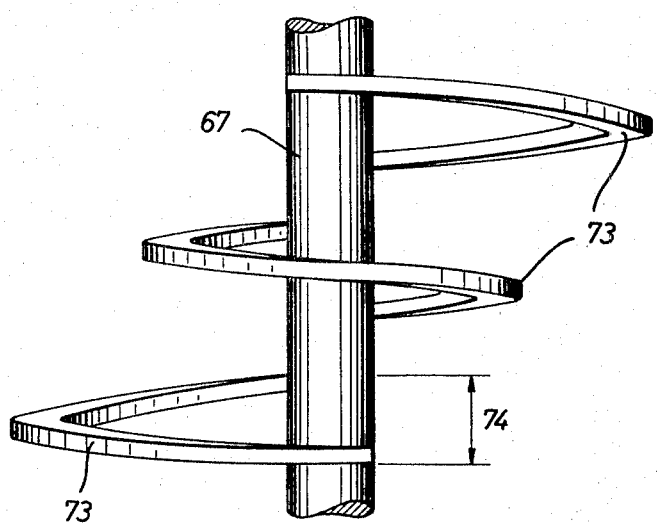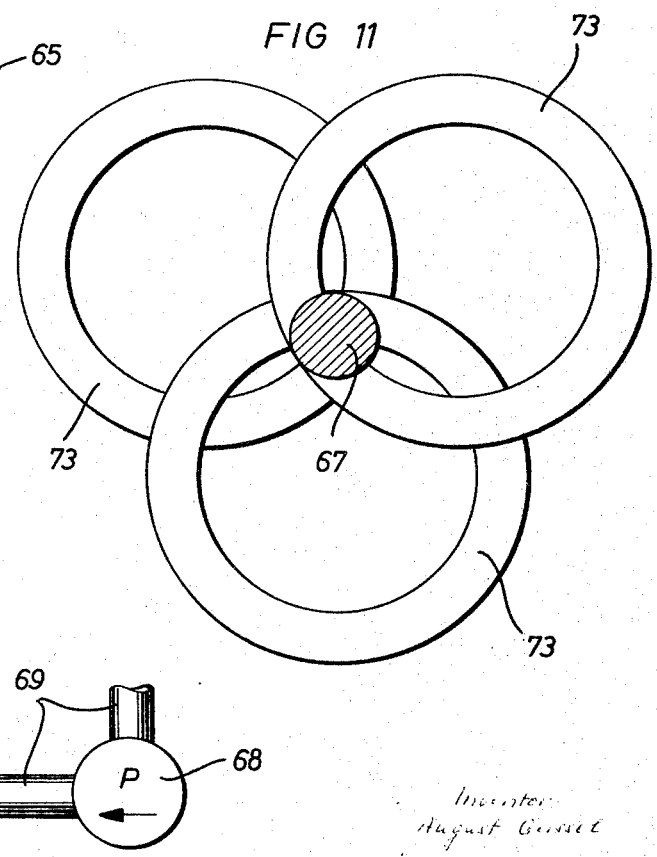

March 11, 1969 A. GEISSEL 3,432,109
MACHINE FOR DISPERSING AND COMMINUTING FLOWABLE MATERIALS
Filed April 22, 1966
FIG.19
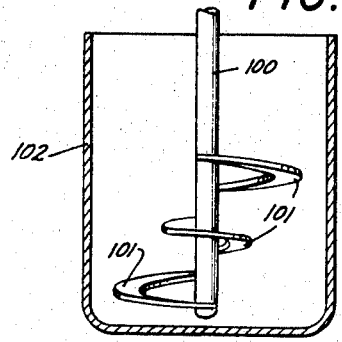
FIG.22
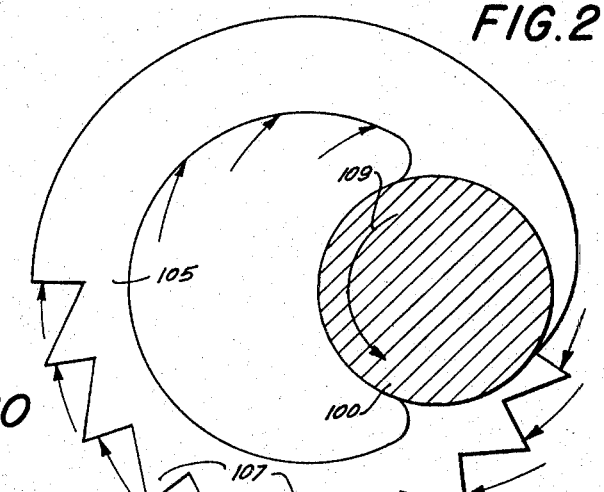
FIG.20
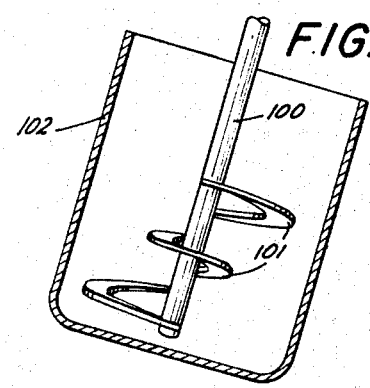
FIG.23
FIG.21
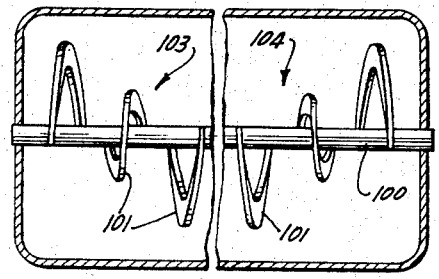
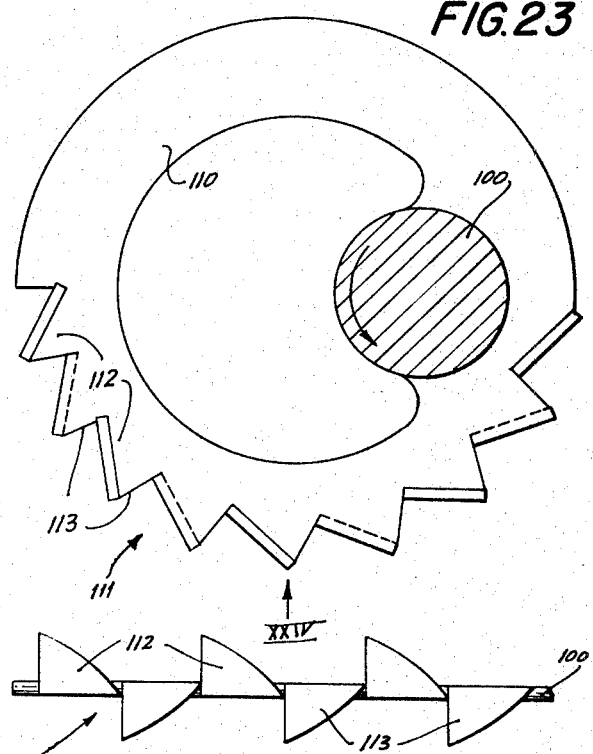
FIG.24
FIG.25
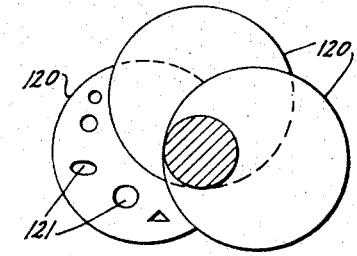
INVENTOR:
AUGUST GEISSEL
BY
Michael J. Striker
his ATTORNEY United States Patent Office 3,432,109
Patented Mar. 11, 1969

3,432,109
MACHINE FOR DISPERSING AND COMMINUTING FLOWABLE MATERIALS
August Geissel, Bergen-Enkheim, Germany, assignor to Gebrueder Netzsch Maschinenfabrik, Selb, Bavaria, Germany
Continuation-in-part of application Ser. No. 362,115, Apr. 23, 1964. This application Apr. 22, 1966, Ser. No. 549,127
Claims priority, application Germany, Jan. 18, 1964, N 24,318; Apr. 23, 1965, N 26,623
U.S. Cl. 241—172          49 Claims
Int. Cl. B02c 17/00, 23/02; B01f 15/00

ABSTRACT OF THE DISCLOSURE

A machine for comminuting dispersing and thoroughly intermixing a plurality of flowable materials accommodated in a chamber into which a rotary drive shaft extends to which a plurality of substantially disk-shaped annular agitating elements are fixed eccentric to the shaft axis and spaced in direction of the axis from each other.

This is continuation-in-part of my copedning application Ser. No. 362,115, filed Apr. 23, 1964, and now abandoned.

The present invention relates to a machine for comminuting, dispersing and/or intimately mixing two or more flowable gaseous, liquid and/or comminuted solid materials. The machine of my invention embraces improvements in apparatus known as ball mills and pebble mills, as well as improvements in dispersing, mixing, kneading, tumbling, dissolving and like machines. Ball mills and pebble mills, also called grinders, are utilized for very fine comminution of pulverulent or granular solid materials and may simultaneously serve to disperse finely comminuted solid materials in a liquid carrier. As a rule, the carrier is a film-forming liquid of medium or high viscosity, and the mill comprises a housing for a supply of spherical or pebble-shaped comminuting elements stirred by agitating elements secured to a drive shaft which is arranged to rotate in the interior of the housing whereby the comminuting elements break up and disperse the charge of pulverulent or granular material which is contained in the housing. In accordance with one of its features, my present invention relates to improvements in the construction configuration and mounting of such agitating elements, and also to a continuously operating pulverizing machine which utilizes such agitating elements. It is also within the purview of my invention to provide a machine which may be utilized for finely dispersing coloidal and other liquid or liquefied or flowable substances without resorting to spherical, pebble-shaped or otherwise configurated comminuting elements, i.e., wherein the dispersing action is carried out exclusively by specially configurated, mounted and distributed agitating elements.

It is an important object of the present invention to provide a very simple, compact and low-cost machine wherein a charge of granular, pulverulent solid or other flowable material may be comminuted still further in a continuous operation, at high speed, and in such a way that all layers of the ultimate product contain highly comminuted particles, gloubules or otherwise configurated minute parts of equal or nearly equal size.

Another object of the invention is to provide an improved ball mill or pebble mill wherein the comminuting action may be carried out simultaneously with a highly satisfactory dispersing action so that the ultimate product will be a finely comminuted solid material which is distributed homogeneously in a gaseous, liquid or liquefied film-forming carrier.

A further object of the invention is to provide a drive shaft with integral or detachable agitating elements of novel construction which may be utilized with advantage in a continuously operating machine of the above outlined type.

An additional object of the invention is to provide a ball mill or a pebble mill wherein all or nearly all spherical or pebble-shaped comminuting elements are subjected to the action of forces which tend to move such elements in similar paths to insure that the comminuting and mixing action of each element is the same or nearly the same as the comminuting action of all other elements.

A concomitant object of my invention is to provide a ball mill which, to my knowledge, is the first successful continuously operating pulverizing machine with spherical comminuting elements and which is capable of discharging a continuous stream of finely comminuted solid material wherein all layers or zones contain particles of equal or nearly equal size.

A further object of the invention is to provide a mill whose spherical or pebble-shaped comminuting elements undergo comparatively little wear, wherein the comminuting action is highly satisfactory even if the diameter of each comminuting element is in the range of several millimeters, and wherein a highly satisfactory comminuting and dispersing action may be achieved while the drive shaft rotates at a relatively low speed which may be substantially less than 1,000 revolutions per minute.

Still another object of the invention is to provide a mill whose spherical or pebble-shaped comminuting elements may be stirred by agitating elements of very simple construction, wherein such agitating elements may transmit to comminuting elements different types of impulses, and wherein a defective agitating element may be replaced in a very simple and time-saving manner.

An additional object of the invention is to provide a machine wherein the position of agitating elements with reference to each other may be adjusted in a time-saving operation and with simple tools so that the machine may be rapidly converted for treatment of different types of flowable materials and for the production of different dispersions.

Another object of the invention is to provide a machine wherein the agitating elements are configurated, arranged and mounted in such a way that each thereof not only contributes to comminution and dispersion of flowable material but also tends to condense and advance the material through and toward the outlet of the housing in which the comminuting, mixing and/or dispersing action takes place.

An additional object of the invention is to provide a pulverizing apparatus wherein different layers of solid material may undergo different types of treatment and wherein the comminuting elements are retained in the comminuting chamber in a very simple way so that only the comminuted material is free to escape from the machine.

A further object of the invention is to provide a machine whose comminuting, mixing and/or dispersing action is not affected by the inclination of its housing or drive shaft so that the machine may be mounted in a vertical, horizontal or otherwise inclined position, depending on the space which is available for the machine in a manufacturing plant or in another establishment.

Another object of my invention is to provide a machine which is equally satisfactory for use as a means for comminuting solid materials, as a means for comminuting and simultaneously dispersing solid materials in a liquid carrier, and/or as a means for finely dispersing two or more flowable materials.

With the above objects in view, one feature of my invention resides in the provision of a machine for comminuting, dispersing and/or thoroughly intermixing a plurality of flowable materials, for example, a ball mill for comminution or further comminution of pulverulent or granular materials. The machine comprises a fixed elongated housing defining a preferably cylindrical comminuting chamber arranged to accommodate two or more flowable materials, a source of flowable materials which is connected with one end of the housing, a pump or a similar device which serves to feed flowable materials from the source to the housing, a rotary drive shaft which extends into the housing and is preferably coaxial with the chamber, a motor or a similar device which serves to rotate the drive shaft at a desired speed, and a plurality of substantially annular or disk-shaped agitating elements carried by and arranged to rotate with the drive shaft to thereby agitate the contents of the chamber. In accordance with my invention, the agitating elements are eccentric with reference to the drive shaft and are distributed in the axial direction of the shaft.

Each agitating element may resemble a circumferentially complete disk, a circumferentially complete ring-shaped annulus, or a helical convolution whose ends are permanently or detachably secured to the shaft. Such convoluted agitating elements may form a continuous or interrupted spiral with several convolutions which will assist the feeding means in conveying the material toward the outlet.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawings, in which:

FIG. 1 is an axial section through a vertical pulverizing machine which embodies one form of the invention and wherein the agitating elements resemble ring-shaped annuli of constant thickness whose planes are normal to the axis of the drive shaft;

FIG. 2 is a greatly enlarged horizontal section as seen in the direction of arrows from the line II—II of FIG. 1;

FIG. 3 is an axial section as seen in the direction of arrows from the line III—III of FIG. 2;

FIG. 4 is an axial section through a slightly different ring-shaped agitating element which is of trapeziform cross section whereby its thickness increases in a direction radially outwardly from the center;

FIG. 5 is an axial section through a third ring-shaped agitating element which is provided with corrugated end faces;

FIG. 6 is an axial section through a fourth ring-shaped agitating element which is of undulate shape;

FIG. 7 is a fragmentary axial section through a portion of a different pulverizing machine wherein the agitating elements are movable axially with reference to the drive shaft and wherein the axial distance between the adjoining agitating elements may be altered at the will of the operator;

FIG. 8 is a similar fragmentary axial section through another pulverizing machine wherein the drive shaft is horizontal and the adjoining agitating elements are kept apart by dished springs;

FIG. 9 is an axial section through a further pulverizing machine wherein each agitating element resembles a helical convolution and wherein such agitating elements are spaced axially and angularly with reference to each other;

FIG. 10 is an enlarged front elevational view of a detail of the machine shown in FIG. 9;

FIG. 11 is an enlarged horizontal section as seen in the direction of arrows from the line XI—XI of FIG. 9;

FIG. 19 is a fragmentary axial section through a dispersing machine which operates without comminuting elements;

FIG. 50 is a similar fragmentary axial section through a dispersing machine whose drive shaft is inclined with reference to a vertical axis;

FIG. 21 is a similar fragmentary section through a third dispersing machine wherein the agitating elements form a plurality of oppositely inclined spirals or helices and wherein the drive shaft is horizontal;

FIG. 22 is an elevational view of an annular agitating element having a serrated peripheral surface;

FIG. 23 is an elevational view of an agitating element which constitutes a modification of the agitating element shown in FIG. 22;

FIG. 24 is an end elevational view as seen in the direction of the arrow XXIV in FIG. 23; and FIG. 25 illustrates a set of disk-shaped agitating elements.

Figure 12:
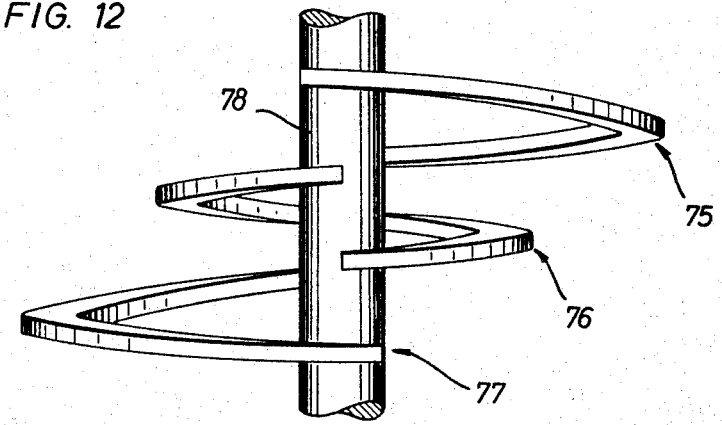
FIG. 12 is a fragmentary front elevational view of an additional pulverizing machine which resembles the one shown in FIGS. 9–11 with the exception that the spirals formed by groups of agitating elements slope alternately in clockwise and counterclockwise directions.

Referring first to FIG. 1, there is shown a continuously operating pulverizing machine in the form of a ball defining an internal chamber 21 the major part of which is filled with metallic comminuting elements here shown as small balls 22 which fill the housing up to a level 23. The top wall 24 of the housing is traversed by a vertical drive shaft 25 which extends coaxially into the chamber 21 and is driven by an electric motor 26 or in another suitable way. The shaft 25 carries a plurality of axially and angularly spaced equidistant agitating elements 27 in the form of circumferentially complete unslotted ring-shaped annuli which are eccentric with reference to the shaft and which are permanently secured thereto by welds 28 shown in FIG. 2. The arrangement is such that the adjoining annuli are angularly spaced with reference to each other with a view to form a substantially helical unit which revolves at high speed when the motor 26 is started.

The pulverulent material which is to undergo further comminuting treatment is stored in a suitable source here shown as a tank 29 connected with the bottom wall 30 of the housing 20 by a supply conduit 31 which contains a metering device here shown as a pump 32. This pump may be driven at different speeds so as to regulate the rate of speed at which the material to be comminuted is being fed into the lower zone of the chamber 21. The dispersion medium (assumed to be a liquid of medium or high viscosity and hereafter called carrier or liquid carrier) is contained in the tank 29 and is admitted together with the pulverulent material. The stream which is being fed through the bottom wall 30 rises in the chamber 21 and is discharged through an outlet 33. This outlet is fixed to or integral with an upper end portion or hood 34 of the housing 20 which hood also includes the top wall 24. While advancing through the chamber 21, the particles of pulverulent material are subjected to the comminuting action of balls 22, annuli 27, shaft 25 and a tubular wall or shell 35 to undergo additional comminuting action and to be finely dispersed in the carrier liquid. A sieve 36 or a similar perforated retainer is provided at the junction of the outlet 33 with the hood 34 to prevent escape of balls 22 from the chamber 21. The dispersion which overflows through the outlet 33 is collected in a suitable receptacle, not shown. In the embodiment of FIG. 1, the centers of consecutive annuli 27 are angularly displaced through 90 degrees with reference to each other. The center 37 of one of the annuli 27 is shown in FIG. 2.

The arrows 39 indicate in FIG. 2 the directions in which the balls 22 impinge against the peripheral surface of an annulus 27, and the arrows 40 indicate the direction in which the balls impinge against the internal cylindrical surface of the same annulus. The shaft 25 is driven in a counterclockwise direction, see the arrow 41. The annuli 27 of FIGS. 1 and 2 are flat rings of constant thickness 42, see FIG. 3, whereby the radial dimension 43 exceeds the thickness 42.

FIG. 4 illustrates a modified ring-shaped annulus 45 which is of trapeziform cross section wherby its thickness increases in a direction radially outwardly so that the inclined end faces 46 oppose the centrifugal force which acts upon the balls. FIG. 5 illustrates another annulus 48 whose end faces 49 are corrugated to increase the area of contact with the balls. Such configuration of the annulus causes the balls to perform additional movements and to intensify the comminuting and dispersing action. The annulus 50 of FIG. 6 is quite similar to the annulus 48 with the exception that the entire body thereof is of undulate shape to define hills 51 and valleys 52. Such configuration also contributes to more intensive comminuting and dispersing action. If desired, different types of annuli may be mounted on the same shaft so as to intensify the comminuting and dispersing action in one or more selected zones of the chamber 21.

FIG. 7 illustrates a portion of a different pulverizing, dispersing and mixing machine having a shaft 55 which carries spacer sleeves 56 to keep the annuli at a selected axial distance with reference to each other. The annuli 57, 58 are of different configuration and are provided with eccentric tubular portions 59 which are slidable on the shaft 55 and may be held against rotation by a flattened face on the shaft or in any other suitable manner, not shown. By the simple expedient of replacing the spacer sleeves 56 with sleeves of different axial length, the machine of FIG. 7 may be converted to treat different types of materials and to produce dispersions of different homogeneousness. Also, each spacer sleeve 56 may be replaced by a series of coaxial sleeves of unit length so that the number of sleeves between adjoining agitating annuli will determine the total number of annuli which may be accommodated in the housing. If desired, the sleeves 56 may be replaced by packages of dished springs, telescopically assembled springs or other biasing means which allow for slight or even substantial changes in the axial position of adjoining annuli. This modification is illustrated in FIG. 8 which shows a horizontal shaft 60, annuli 61 which are disposed in vertical planes, and dished springs 62.

FIG. 9 illustrates a different pebble mill or ball mill having an elongated housing 65 defining an upright chamber 66 which receives a vertical shaft 67. A pump 68 feeds a stream of pulverulent material and a carrier liquid through a supply conduit 69 and the latter discharges continuously through the bottom wall 70 of the housing 65. An outlet 71 conveys overflowing finely dispersed comminuted material from the chamber 66 and its intake is provided with a sieve 72 to prevent escape of spherical or pebble-shaped comminuting elements, not shown in FIG. 9.

In accordance with the present invention, the shaft 67 carries a series of vertically spaced eccentric annular agitating elements 73 each of which resembles a portion of or an entire helical convolution and each of which has its axially spaced ends welded or otherwise secured to the shaft. The elements 73 are angularly spaced with reference to each other so that, in their entirety, they may resemble a spiral with several convolutions which rotates in a sense to move the mass admitted at 69 in a direction toward the outlet 71 when the shaft 67 is driven by a suitable motor or transmission, not shown.

FIGS. 10 and 11 illustrate on a greatly enlarged scale a portion of the shaft 67 and three agitating elements 73. In the top plan view of FIG. 11, each agitating element 73 resembles a split ring whose ends are spaced axially with reference to each other and are secured to the shaft 67. The axial distance 74 between the spaced-apart ends of the agitating elements 73 may but need not be the same. FIG. 11 shows further that the adjoining agitating elements 73 are angularly spaced with reference to each other and that such angular spacing equals or approximates 120 degrees. In FIGS. 9 to 11, each agitating element slopes in a counterclockwise direction. Thus, and in order to follow the upper end face of any one of the elements 73 in a direction from the upper toward the lower end thereof, the eye of the observer will follow a sloping helical path which is convoluted in a counterclockwise direction, see particularly FIG. 10.

Figure 13:
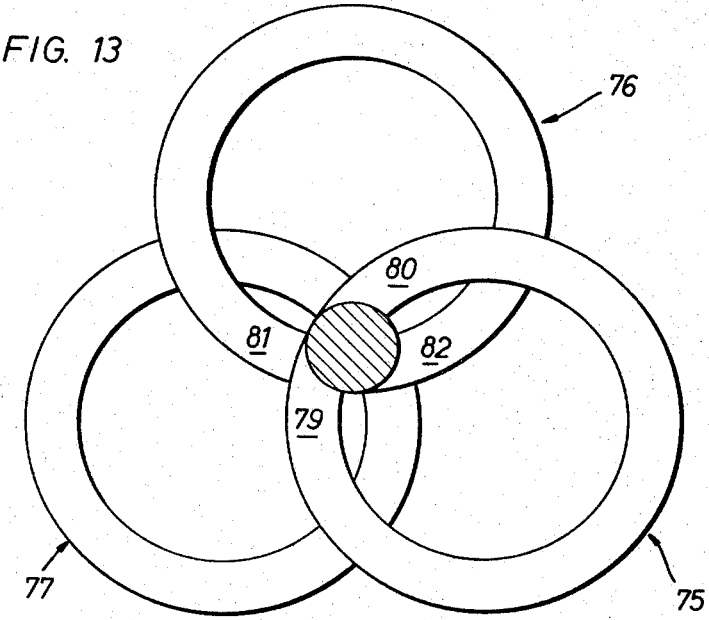
FIG. 13 is a top plan view of the structure shown in FIG. 12.

FIGS. 12 and 13 illustrate a portion of a modified ball mill or pebble mill wherein the agitating elements 75, 76, 77 on the drive shaft 78 are configurated in the same way as shown in FIGS. 9 to 11, with the important exception that the intermediate agitating element 76 slopes downwardly in a clockwise direction whereas the outer elements 75, 77 slope downwardly in a counterclockwise direction. In other words, and as viewed in FIG. 13, the outer agitating element 75 slopes downwardly from the end 79 to the end 80 thereof, i.e., in a counterclockwise direction. On the other hand, the intermediate agitating element 76 slopes downwardly from the end 81 to the end 82 thereof, namely, in a clockwise direction. The slope of the outer element 77 is the same as that of the outer element 75. Other combinations are possible, for example, by placing two or more agitating elements 76 in series and by alternating such series of agitating elements 76 with one or more agitating elements 75 or 77.

An advantage of the structure shown in FIGS. 12 and 13 is seen to reside in that the agitating elements bring about at least some condensation of the dispersion. This is important for the comminuting action of the machine because, under certain operating conditions, the comminuting elements (balls or pebbles) have a tendency to float in the solid material which is undesirable because such floating results in absorption of kinetic energy and in greatly reduced comminuting effect. In fact, in some instances, and particularly when the material to be comminuted is one of high specific weight, if the carrier liquid is one of high viscosity, if the material to be comminuted travels at very high speed, and in case of thixotropy, the comminuting effect of floating comminuting elements will be reduced to zero.

Figure 14:
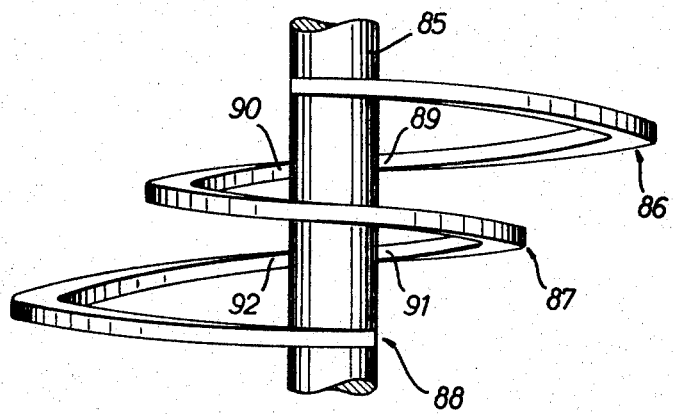
FIG. 14 is a fragmentary front elevational view of still another pulverizing machine which is practically identical with the one shown in FIGS. 9 to 11 excepting that the agitating elements form a continous helix or spiral in which the ends of an intermediate agitating element are disposed at the same level as the nearest ends of two adjoining agitating elements.

Referring to FIG. 14, there is shown a portion of a ball mill or pebble mill including a vertical drive shaft 85, an upper or outer agitating element 86, an intermediate agitating element 87 and a lower or outer agitating element 88. The difference between the constructions shown in FIGS. 10–11 and 14 is that the agitating elements 86 to 88 form a continuous helix with several convolutions whereas the elements 73 form an interrupted helix. In other words, and referring to FIG. 14, the lower end 89 of the agitating element 86 is at the level of the upper end 90 of the agitating element 87, and the lower end 91 of the agitating element 87 is at the level of the upper end 92 of the agitating element 88. In FIG. 10, the lower end of the upper agitating element 73 is spaced axially from the upper end of the intermediate agitating element 73.

Figure 16:
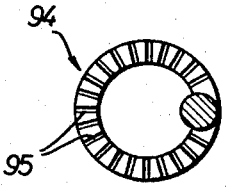
FIG. 16 is a top plan view of an agitating element at least one end face of which is provided with radially extending grooves.
Figure 17:
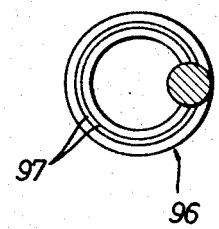
FIG. 17 is a similar top plan view of an agitating element at least one end face of which is provided with circumferential grooves.

A very important advantage of agitating elements which resemble helical convolutions is that the sloping annular end faces of such elements contribute even more actively to acceleration and comminuting action of spherical or pebble-shaped comminuting elements. Such acceleration of comminuting elements in response to engagement with and on rebounding from the end faces of helical agitating elements will be observable regardless of whether the agitating elements are true helices, whether the agitating elements form portions of one or more full convolutions, and/or whether the agitating elements are formed with one or two smooth, corrugated or otherwise shaped end faces. It will be noted that FIGS. 9–11 show agitating elements with smooth internal, peripheral and end faces but it is to be understood that such faces may be corrugated in a manner as illustrated in FIGS. 5, 16 and 17 or that each agitating element may be undulated in a manner as shown in FIG. 6.

Figure 15:
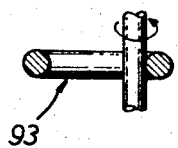
FIG. 15 is an axial section through an agitating element whose cross-section is of circular outline.
Figure 18:
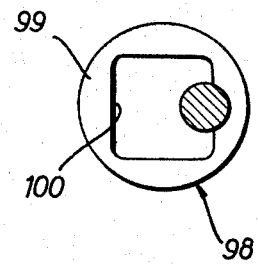
FIG. 18 is a top plan view of a further agitating element which is provided with a polygonal internal surface.

It can be said that the basic advantage of helical agitating elements resides in that the entire surface area of each agitating element contributes to acceleration and reorientation of comminuting elements. Such advantage will be inherent in helical agitating elements of polygonal cross section as shown in FIGS. 9 to 14, in helical agitating elements 93 of circular cross section as shown in FIG. 15, in helical agitating elements 94 with end faces having radially extending grooves as shown at 95 in FIG. 16, and in helical agitating elements 96 with end faces having circumferentially extending grooves 97 as shown in FIG. 17. It is also possible to use circumferentially complete or slotted agitating elements 98 of the type shown in FIG. 18 wherein the peripheral surface 99 is of circular cylindrical outline and wherein the internal surface 100 is of polygonal form. The agitating element 98 of FIG. 18 may be modified by providing it with a polygonal peripheral surface and with a cylindrical or oval internal surface.

In all heretofore described embodiments of my invention, the agitating elements may be secured to or supported directly by the drive shaft so that there is no need for spokes or similar connecting bodies which could affect movements of the comminuting elements. Referring again to FIG. 2, the left-hand portion of the peripheral surface on that agitating element 27 which is nearer to the observer will cause the balls 22 to travel in a path toward the internal surface of the cylindrical shell 35 of the housing 20 (centrifugal movement). On the other hand, the internal surface of the same agitating element 27 will cause the balls 22 to move toward the axis of the housing 20 (centripetal movement). In all or nearly all instances, the movement of balls is substantially tangential with reference to the surfaces of the agitating elements so that the wear on the balls is minimal and little energy is required to rotate the drive shaft. The agitating elements preferably extend into close proximity of the internal surface on the housing so that each thereof agitates a large number of comminuting elements in response to each revolution of the drive shaft. In other words, each agitating element will agitate a certain number of comminuting elements in a zone beginning at the periphery of the drive shaft and terminating at the internal surface of the shell 35. The stirring action is very effective because the agitating elements are eccentric with reference to the drive shaft and because they are spaced axially and angularly with reference to each other. While the comminuting elements mainly rotate or orbit in the same direction, they travel at different speeds which brings about repeated rebounding of rapidly moving comminuting elements on impact against slower comminuting elements with resultant frictional engagement and highly satisfactory comminuting and dispersing action.

It was found that the machine of my invention will operate very satisfactorily with comminuting elements having a diameter in the range of 1–4 mm. and even higher, and at a rotational speed which is but a fraction of the speeds required in conventional ball mills or pebble mills. Thus, and by utilizing balls with a diameter in the range of 4 mm., the machine will produce highly satisfactory results if the drive shaft rotates at a speed of about 350 r.p.m. The operation at such low rotational speed will cause much less wear even though the comminuting and dispersing effect is very satisfactory.

FIG. 19 illustrates a portion of a dispersing machine which is especially suited to dissolve lyophilic colloids, for example, for dissolving cellulose esters in suitable solvents and/or swelling agents, for dissolving cellulose xanthagenate in the preparation of spinning solutions, in the production of paints and lacquers, for dry- or liquid-tumbling of chocolate, for thixotropy of various gels, and/or for acceleration and regulation of chemical or physical reactions and/or conversions. The individual ingredients of the materials to be intermixed with and/or dispersed in each other may be present in solid, gaseous or liquid form, in crystalline or colloidal form, as well as in lyophilic or lyophobic state. Heretofore, such dispersing operations were carried out mainly by resorting to screw-shaped swirlers, for example, those known as Cowles dissolvers, and similar apparatus. All such conventional apparatus are either too slow or possess other serious defects.

In accordance with my present invention, and as shown in FIG. 19, a very satisfactory dispersing machine can be obtained by providing the drive shaft 100 with a set of axially distributed annular agitating or dispersing elements 101 each of which resembles a portion of or a full helical convolution and the two ends of which are axially spaced from each other. The agitating elements 101 are eccentric with reference to the drive shaft 100. The shaft 100 may be driven in the same was as described in connection with FIG. 1. In the embodiment of FIG. 19, the agitating elements 101 are spaced axially and angularly with reference to each other, and the drive shaft 100 is arranged to rotate about a truly vertical axis. The manner in which two or more flowable materials are being fed into the housing 102 of the dispersing machine is not shown in FIG. 19; one can resort to a pump or the like in the same way as described hereinbefore. It is also possible to feed different flowable materials from separate sources.

FIG. 20 illustrates the structure of FIG. 19 but with the axis of the drive shaft 100 inclined with reference to a truly vertical axis.

In the embodiment of FIG. 21, the axis of the drive shaft 100 is horizontal, and this drive shaft carries a set of eccentrically mounted helical agitating elements 101 each of which resembles a full helical convolution and which together form two oppositely inclined spirals 103, 104.

FIG. 22 shows a drive shaft 100 for a specially configurated annular agitating element 105 which is again eccentric with reference to the shaft. A portion of the peripheral surface on the agitating element 105 is serrated, as shown at 106, and the tip of each tooth 107 is located at a different distance from the axis of the shaft 100. It is clear that the peripheral speeds of teeth 107 are different even if the drive shaft 100 is rotated at a constant speed. Such an arrangement contributes to especially satisfactory dispersion of flowable materials because any particles which are engaged and repelled by one tooth 107 are caused to enter the range of another tooth which rotates at a different speed. The arrows 108 indicate the directions in which the radial faces of teeth 107 engage particles of flowable materials in the chamber of the housing wherein the shaft 100 of FIG. 22 is installed. It is clear that this shaft carries a plurality of axially spaced agitating elements 105 and that each such agitating element may be disposed in a plane which is normal to the axis of the shaft or that each element 105 may resemble a portion of a spiral. The direction in which the shaft 100 rotates is indicated by the arrow 109.

FIG. 23 illustrates an annular agitating element 110 which is eccentric with reference to the drive shaft 100 and whose peripheral surface again comprises a serrated portion 111. However, alternating teeth 112, 113 of this serrated portion are bent in opposite directions, i.e., to the opposite sides of the general plane of the agitating element 110. This is best shown in FIG. 24. In this embodiment of my invention, the vertical faces of the teeth 112, 113 act counter to centrifugal acceleration of treated materials but their mechanical action is exceptionally effective. This is particularly important in treatment of materials having a low viscosity or when the mixture which is introduced into the housing of the dispersing machine contains a small percentage of solid ingredients, i.e., when the action of gravity upon the treated particles in rather weak.

It is to be understood that the dispersing machines of FIGS. 19 to 24 may embody all or nearly all such features which were discussed in connection with FIGS. 1 to 18, with the sole exception that their housings need not accommodate any spherical or pebble-shaped comminuting elements, such as the elements 22 shown in FIG. 1. Thus, and as described in connection with FIG. 18, the agitating elements of the dispersing machine need not be of truly circular outline, for example, they may assume an elliptical, cordiform, polygonal or other outline. Furthermore, the thickness of one or more annular agitating elements may increase in a direction from the internal surface toward the periphery, as shown in FIG. 4, or in the opposite direction.

Finally, and as shown in FIG. 25, the drive shaft 100 of my dispersing apparatus may carry a set of disk-shaped agitating elements 120. Such agitating elements may include solid disks as well as one or more disks which are provided with holes, bores, perforations or analogous apertures 121. As shown in FIG. 25, all of the apertures 121 need not be of the same size.

One or both end faces of the agitating elements shown in FIGS. 19 to 25 can be provided with concentric annular and/or radial grooves as shown in FIGS. 17 and 16. Also, the agitating elements may be corrugated or undulated as shown in FIGS. 5 and 6. Furthermore, instead of being welded or otherwise permanently secured to their drive shaft, the agitating elements of the dispersing machines shown in FIGS. 19–25 may be mounted in a manner as shown in FIGS. 7 and 8. Disk-shaped or annular agitating elements of my dispersing machine may resemble portions or flights of continuous or interrupted spirals which slope in the same direction or in opposite directions. Portions adjoining the internal and/or peripheral surfaces of annular or disk-shaped agitating elements may be rounded as shown in FIG. 15. It is also possible to utilize agitating elements whose cross-sectional area diminishes in a direction toward the periphery or to resort to agitating elements of streamlined shape.

In summation, it can be said that machines of the type shown in FIGS. 1 to 25 may be utilized for highly effective continuous or intermittent stirring, dissolving, mixing, comminuting, kneading, dispersing, homogenizing, emulsifying, flushing, dry- or liquid-tumbling and/or for acceleration and regulation of chemical and physical reactions.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine for comminuting, dispersing and thoroughly intermixing a plurality of flowable materials, a housing defining a chamber arranged to accommodate such flowable materials; a rotary drive shaft extending into said chamber; and a plurality of substantially disk-shaped annular agitating elements firmly fixed to and rotating with said shaft to agitate the contents of said chamber when the shaft rotates; said agitating elements being eccentric with reference to and being distributed axially of said shaft.

2. A structure as set forth in claim 1, wherein said chamber accommodates a supply of comminuting elements which are agitated by said agitating elements in response to rotation of said drive shaft.

3. A structure as set forth in claim 2, wherein said agitating elements are angularly spaced with reference to each other.

4. A structure as set forth in claim 2, wherein at least some of said agitating elements are disposed in planes which are normal to the axis of said drive shaft.

5. A structure as set forth in claim 2, wherein said housing is of cylindrical shape and said chamber is an upright chamber, said drive shaft being rotatable about a vertical axis.

6. A structure as set forth in claim 2, wherein said drive shaft is inclined in such a way that the position of its axis is other than vertical.

7. A structure as set forth in claim 2, wherein said agitating elements are disposed in horizontal planes.

8. A structure as set forth in claim 2, wherein said agitating elements are disposed in planes at least some of which are at least slightly inclined with reference to a horizontal plane.

9. A structure as set forth in claim 2, wherein each of said agitating elements is a slotted annulus having axially spaced ends secured to said drive shaft so that each such annulus resembles a portion of a helix.

10. A structure as set forth in claim 9, wherein at least some of said annuli are spaced angularly and axially with reference to each other.

11. A structure as set forth in claim 9, wherein at least some of said annuli form full helical convolutions.

12. A structure as set forth in claim 9, wherein said annuli are axially spaced from each other.

13. A structure as set forth in claim 9, wherein at least some of said annuli together form a continuous spiral with several convolutions.

14. A structure as set forth in claim 2, wherein at least some of said agitating elements resemble annuli each having two axially spaced ends carried by said drive shaft so that such annular agitating elements resemble helices, at least one of said annular agitating elements sloping in a direction other than the remaining annular agitating elements.

15. A structure as set forth in claim 2, wherein at least some of said agitating elements resemble annuli each having two axially spaced ends secured to said drive shaft so that each such annulus forms a portion of a helix, said annuli including two outer annuli and at least one intermediate annulus and the ends of said intermediate annulus being spaced axially from the ends of the annuli which are nearest thereto.

16. A structure as set forth in claim 2, wherein at least some of said agitating elements resemble annuli each having two axially spaced ends secured to said drive shaft so that each such annulus resembles a portion of a helix, said annuli including two outer annuli and at least one intermediate annulus and the ends of said intermediate annulus being disposed at the same level as the ends of each of the annuli nearest thereto.

17. A structure as set fort hin claim 2, wherein each of said agitating elements is an annulus and wherein said annuli are spaced axially and angularly with reference to each other, at least some of said annuli being of substantially trapeziform cross section whereby the thickness of such annuli increases in a direction radially outwardly from the center thereof so that each annulus of trapeziform cross section is bounded by at least one inclined annular end face.

18. A structure as set forth in claim 2, wherein said agitating elements are annuli which are spaced axially and angularly with reference to each other, at least some of said annuli having uneven end faces.

19. A structure as set forth in claim 2, wherein said agitating elements are annuli which are spaced axially and angularly with reference to each other, at least some of said annuli being of undulate shape.

20. A structure as set forth in claim 2, wherein said comminuting elements are of spherical shape and wherein said agitating elements are annuli which are spaced axially and angularly with reference to each other.

21. A structure as set forth in claim 2, wherein at least some of said agitating elements comprise eccentric annular portions surrounding and non-rotatably carried by said drive shaft so that each such agitating element is compelled to share angular movements of said shaft.

22. A structure as set forth in claim 21, further comprising annular spacer means provided on said drive shaft intermediate said annular portions to maintain the respective agitating elements at a requisite axial distance from each other.

23. A structure as set forth in claim 22, wherein at least some of said spacer means are resilient and can yield in the axial direction of said drive shaft.

24. A structure as set forth in claim 23, wherein at least some of said spacer means comprise dished springs.

25. A structure as set forth in claim 2, wherein said agitating elements are movable axially of but share angular movements of said drive shaft.

26. A structure as set forth in claim 2, wherein said machine is a continuously operating mill for comminution of pulverulent materials and wherein said housing defines an elongated cylindrical chamber, and further comprising means for rotating said drive shaft, a source of pulverulent material connected with one end of said housing, and means for feeding such pulverulent material from said source into said housing, said housing having outlet means provided in the region of the other end thereof and said drive shaft being coaxial with said chamber, said agitating elements being constituted by annuli and being arranged to promote further comminution of pulverulent material by agitating the comminuting elements in said chamber, at least some of said annuli being spaced axially and angularly with reference to each other.

27. A structure as set forth in claim 26, wherein the axis of said drive shaft is vertical and said outlet means is disposed at a level above said one end of the housing.

28. The structure as set forth in claim 26, further comprising a sieve disposed in said chamber at the intake end of said outlet means to prevent escape of comminuting elements from said housing.

29. A structure as set forth in claim 1, wherein said agitating elements are spaced from each other in the axial direction of said drive shaft.

30. A structure as set forth in claim 1, wherein at least some of said agitating elements resemble portions of helices and wherein at least some of such helical agitating elements form a continuous spiral.

31. A structure as set forth in claim 1, wherein at least some of said agitating elements resemble portions of helices and wherein at least some such helical agitating elements together form a plurality of spirals which slope in different directions.

32. A structure as set forth in claim 1, wherein at least some of said agitating elements have grooved end faces.

33. A structure as set forth in claim 32, wherein said end faces are provided with annular grooves.

34. A structure as set forth in claim 32, wherein said end faces are provided with radial grooves.

35. A structure as set forth in claim 1, wherein at least some of said agitating elements have annular surfaces and wherein each such agitating element has a rounded portion adjacent to the respective annular surface.

36. A structure as set forth in claim 1, wherein at least some of said agitating elements have peripheral surfaces provided with serrated portions.

37. A structure as set forth in claim 36, wherein at least some of said serrated portions have teeth alternately extending in opposite directions from the general planes of the respective agitating elements.

38. A structure as set forth in claim 1, wherein at least some of said agitating elements resemble annuli of substantially circular cross-sectional outline.

39. A structure as set forth in claim 1, wherein at least some of said agitating elements are of streamlined shape.

40. A structure as set forth in claim 1, wherein the thickness of at least some of said agitating elements varies in a direction from the center toward the periphery thereof.

41. A structure as set forth in claim 1, wherein said housing resembles a hollow upright cylinder and said drive shaft is rotatable about a substantially vertical axis.

42. A structure as set forth in claim 1, wherein said drive shaft is rotatable about an axis which is inclined with reference to a vertical axis.

43. A structure as set forth in claim 1, wherein at least some of said agitating elements are disposed in horizontal planes.

44. A structure as set forth in claim 1, wherein at least some of said agitating elements are disposed in planes which are inclined with reference to a horizontal plane.

45. A structure as set forth in claim 1, wherein the thickness of at least some of said agitating elements diminishes in a direction from the peripheral surfaces toward the centers of such agitating elements.

46. A structure as set forth in claim 1, wherein at least one end face of at least some of said agitating elements is corrugated.

47. A structure as set forth in claim 1, wherein at least some of said agitating elements are detachable from said drive shaft.

48. A structure as set forth in claim 47, further comprising distancing elements provided on said drive shaft and interposed between said detachable agitating elements.

49. A structure as set forth in claim 1, wherein the outline of at least some of said agitating elements deviates from a circular outline.

References Cited

UNITED STATES PATENTS

| 538,115 | 4/1895 | Lucas | 241—284 X |
| 2,980,407 | 4/1961 | Luscombe | 259—107 X |
| 3,076,637 | 2/1963 | Moziek et al. | 259—8 |
| 3,149,789 | 9/1964 | Szegvari | 241—172 |
| 3,156,451 | 11/1964 | Waas | 259—107 |

FOREIGN PATENTS 685,226    12/1939    Germany.

ANDREW R. JUHASZ, Primary Examiner.

FRANK T. YOST, Assistant Examiner.

U.S. Cl. X.R.

259—8